United States Patent [19]

Ickes

[11] 3,894,753
[45] July 15, 1975

[54] FIREWOOD CART

[76] Inventor: John C. Ickes, 3615 Woolworth Bldg. 233, Everton, Mo. 10007

[22] Filed: Feb. 5, 1974

[21] Appl. No.: 440,156

[52] U.S. Cl.............. 280/47.34; 193/7; 193/25 R; 280/79.2
[51] Int. Cl............................................. B62b 3/12
[58] Field of Search............ 280/79.1, 79.2, 47.34; 296/152; 193/5, 25 R, 25 B, 7

[56] References Cited
UNITED STATES PATENTS

| | | | |
|---|---|---|---|
| 1,258,759 | 3/1918 | Floehr | 193/25 R |
| 2,513,604 | 7/1950 | Vandemark | 280/79.1 X |
| 2,573,714 | 11/1951 | Karl | 193/5 X |
| 3,542,220 | 11/1970 | Propst | 280/79.2 X |

Primary Examiner—David Schonberg
Assistant Examiner—Michael J. Forman

[57] ABSTRACT

A cart for carrying firewood into a house and also used to maintain a supply of wood near a fireplace; the cart consisting of a box for containing a supply of firewood logs, the box being mounted upon wheels, a push handle at a rear of the box, and a side wall of the box being outwardly pivotable so a roll of fabric can be pulled over it and extended along a floor so to prevent wood bark, slivers and the like to litter a floor which the firewood is transfered to a fireplace.

4 Claims, 5 Drawing Figures

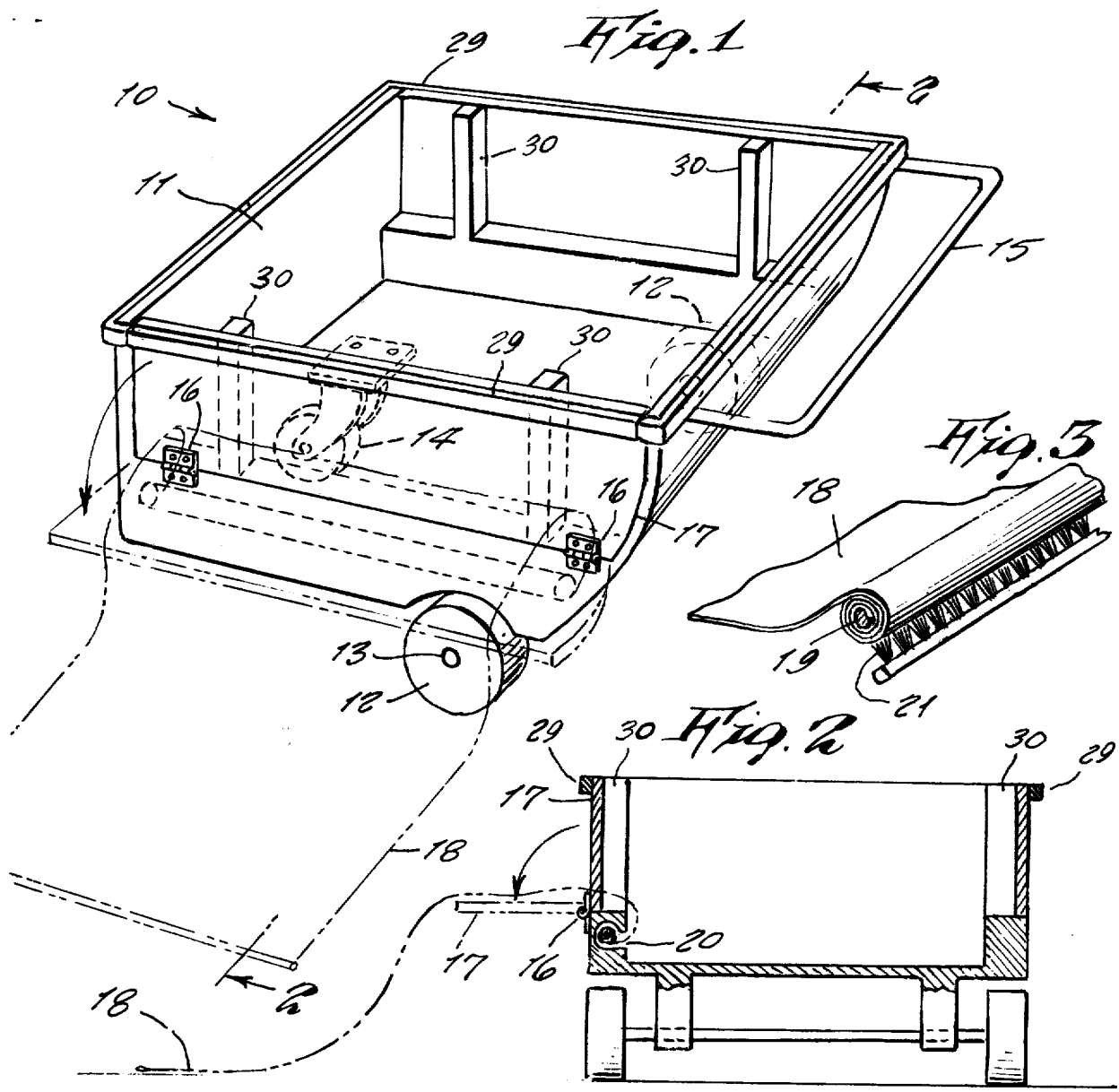
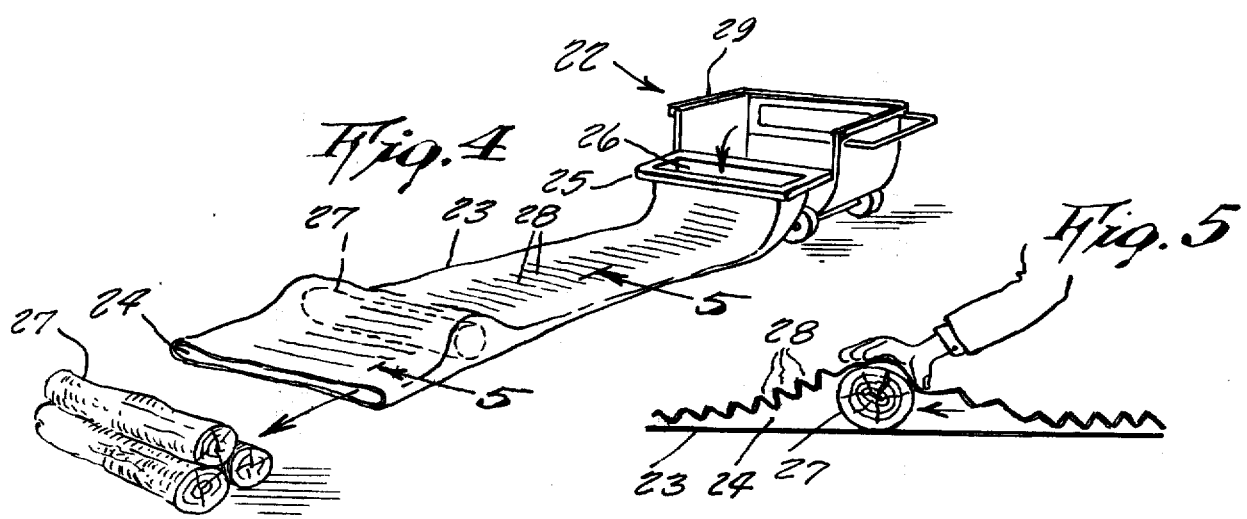

FIREWOOD CART

This invention relates generally to carts.

A principle object of the present invention is to provide a cart to deliver firewood into a house and to a fireplace and which includes an extendable fabric to cover a floor so to prevent wood debris from littering the floor as the firewood is transfered from the cart to a wood pile near the fireplace.

Another object is to provide a firewood cart which alternately can be used to store the wood near the fireplace.

Yet another object is to provide a firewood cart in which a ride wall of the cart can be pivoted down so to eliminate the need to lift heavy firewood logs high over the top of the cart.

Other objects are to provide a firewood cart which is simple in design, inexpensive to manufacture, rugged in construction, easy to use and efficient in operation.

These and other objects will be readily evident upon a study of the following specification and the accompanying drawing wherein:

FIG. 1 is a perspective view of the present invention, and showing in dot dash line the cart in position for being unloaded of wood.

FIG. 2 is a cross sectional view taken on line 2—2 of FIG. 1.

FIG. 3 is a perspective view showing a brush unit that sweep the wood letter from a fabric cover as the cover is being rolled up after use.

FIG. 4 is a modified design of the invention in which the fabric cover is tubular so logs can be rolled inside of it when transfered from the cart to a fireplace.

FIG. 5 is a cross sectional view on line 5—5 of FIG. 4, and showing a log being rolled.

Referring now to the drawing in detail, and more particularly to FIGS. 1 to 3 at this time, the reference numeral 10 represents a firewood cart according to the present invention wherein there is a box 11 supported at its rear on a pair of rear wheels 12 mounted on an axle 13, and a freely pivotable single front castor wheel 14.

The box has a rearward push handle 15 in order to move the cart across a floor.

The box includes a door 17 on one side thereof and which is pivotable about hinges 16 so to extend horizontally outward and allow firewood logs to be moved across it.

A roll of fabric 18 stored on a window-shade type roller 19 is stored in a recess 20, the fabric being able to be pulled out over the open door 17 and across a floor to a fireplace.

In operative use, it is now evident that the logs can be easily lifted from the cart through the doorway of the opened door and carried to a fireplace without littering a floor. After unloading the fabric is rewound on the spring loaded roller and at same time the litter is swept off therefrom into the box 11 by a brush 21.

In FIGS. 4 and 5, a modified firewood cart 22 is the same as above described except that the fabric 18 is substituted by a tubular fabric 23 having central opening 24 therethrough so to allow the logs to roll through it, thus eliminate external littering to occur. The tubular fabric at one end is secured to the cart door 25 which in this form of the invention has a central opening 26 through it that communicates with fabric opening 24, and into which the logs 27 are deposited during unloading. The upper side of the tubular fabric 23 is accordian pleated as shown at 28 in order to allow longitudinal movement thereof during log rolling, as shown in FIG. 5.

It is to be noted that a rubber bumper 29 is mounted around the upper edge of the box, and upon which wood logs may be rested during loading or unloading the cart. This bumper will be replacable as it accordingly will be subject to hard wear.

It is also to be noted that the cart is provided with uprights 30. These uprights serve an important purpose when the door 17 is dropped and keep off stress from the sides.

While various changes may be made in the detail construction, it is understood that such changes will be within the spirit and scope of the present invention as is defined by the appended claims.

What is claimed is:

1. A firewood cart comprising a container having a floor front, rear and side walls, including a pair of rear wheels rotatably mounted under the container about a common axis normal to the side walls and including a single pivotable castor front wheel mounted under the container between the side walls, including a push handle mounted on said rear wall, one of said side walls having an outwardly opening door with a bottom edge mounted pivotally on the side wall above the container floor, in further combination with fabric mounted in the cart side wall and adapted to be pulled outward through the door when opened to a predetermined exterior location to provide a protective covering for rolling logs from the cart through the open door to said location, said fabric being mounted inside the cart, at the door and disposed whereby said fabric engages the door when opening forming a continuous protective covering from the cart to the said location.

2. A cart as in claim 1 including a roller rotatably mounted in a recess in said side wall between the bottom edge of the door and the floor, said fabric being rolled up on the roller and adapted to be unrolled and extended through and over said door when open.

3. A cart as in claim 2 further including spaced upright abutting said side walls and rubber bumpers mounted on the upper periphery of the container, said uprights maintaining and guiding the logs when unloading.

4. A cart as in claim 1 wherein the fabric is tubular and mounted about an aperture through said door.

* * * * *